(12) United States Patent
Hirano

(10) Patent No.: US 6,757,486 B2
(45) Date of Patent: Jun. 29, 2004

(54) HEAT STORAGE TYPE HEATER AND METHOD OF CONTROLLING INPUT AND OUTPUT OF HEAT OF THE SAME

(75) Inventor: Satoshi Hirano, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 184 days.

(21) Appl. No.: 09/945,668

(22) Filed: Sep. 5, 2001

(65) Prior Publication Data

US 2002/0031339 A1 Mar. 14, 2002

(30) Foreign Application Priority Data

Sep. 6, 2000 (JP) ..................................... 2000-270663

(51) Int. Cl.[7] ............................................. H05B 3/00
(52) U.S. Cl. ........................................ 392/344; 165/10
(58) Field of Search ................................ 392/344, 343, 392/346, 345, 339; 165/104.21, 104.11, 104.17, 10, 902; 126/400, 263.01

(56) References Cited

U.S. PATENT DOCUMENTS

| | | | |
|---|---|---|---|
| 2,706,716 A | 4/1955 | Howe et al. | |
| 3,093,308 A | 6/1963 | Snelling | |
| 3,532,856 A | * 10/1970 | Collins | 392/344 |
| 3,683,152 A | * 8/1972 | Laing | 392/345 |
| 4,248,291 A | 2/1981 | Jarmul | |
| 4,561,493 A | * 12/1985 | Yanadori et al. | 165/10 |
| 4,585,572 A | 4/1986 | Lane et al. | |
| 4,817,704 A | 4/1989 | Yamashita | |
| 4,850,424 A | 7/1989 | Mitani et al. | |
| 4,977,953 A | * 12/1990 | Yamagishi et al. | 165/10 |
| 5,957,193 A | * 9/1999 | Kanada | 165/10 |

FOREIGN PATENT DOCUMENTS

| | | | |
|---|---|---|---|
| GB | 2228792 | * | 9/1990 |
| JP | 61-255980 | * | 11/1986 |
| JP | 62-162898 | * | 7/1987 |
| JP | 2-6587 | * | 1/1990 |
| JP | 2-37251 | * | 2/1990 |
| JP | 6-143981 | * | 3/1991 |
| JP | 3-263779 | * | 11/1991 |
| JP | 3-62882 | * | 5/1994 |
| JP | 6-281372 | * | 10/1994 |
| JP | 7-198281 | * | 8/1995 |
| JP | 2000-111282 | * | 4/2000 |

* cited by examiner

Primary Examiner—John A. Jeffery
(74) Attorney, Agent, or Firm—Oblon, Spivak, McClelland, Maier & Neustadt, P.C.

(57) ABSTRACT

A heat-storage heater which has a function of compensating a time lag between the generation and emission of heat and comprises a device such as a heat exchanger or electric heater supplying heat to a heat-storing material 1 capable of being supercooled, the heat-storing material 1 being filled into a plurality of small containers 2, a device such as a heat exchanger, thermoelectric element, electrodes, or vibrator 3 for releasing the supercooled state of the heat-storing material, and a thermal radiation surface.

14 Claims, 5 Drawing Sheets

HEAT STORAGE TYPE HEATER AND METHOD OF CONTROLLING INPUT AND OUTPUT OF HEAT OF THE SAME

TECHNICAL FIELD OF THE INVENTION

The present invention relates to a heat storage type heater which stores heat in a heat-storing material and supplies the heat to different types of heat-utilizing facilities, e.g., for heating and hot-water supply, and a method of controlling input and output of heat to and from the heat storage type heater.

DESCRIPTION OF PRIOR ART

FIG. 10 shows a basic configuration of conventional latent heat storage type heating-devices which utilize the supercooling phenomena of materials (for example, see Japanese Unexamined Patent Application Publication Nos. 62-228822, 3-292214, 6-11145 and 6-281372).

In FIG. 10, a heat-storing material 21, which presents a supercooling phenomenon, is contained in a container 22, the container 22 is provided with a mechanism 23 to which energy is externally supplied so that the supercooled state of the heat-storing material 21 is released, the container 22 is enclosed with a case 25 in which a heat medium 24 is accommodated, and the entire surface or a part of the surface of the case is a heat radiation surface.

In this heat storage type heating-device, first, the heat-storing material 21 is externally heated through the heat medium 24 to be melted. The melted heat-storing material 21 is let to stand as it is till heat is required. When the stored heat is required, energy is supplied to the mechanism 23 for releasing the supercooled state so that the start of the nucleation in the heat-storing material 21 is promoted, and the material 21 is solidified. The heat-storing material 21, after the solidification starts, is recovered to the melting point. The heat at the melting point is radiated to a material to be heated or a space via the heat medium 24 or via the heating medium 24 and the heat radiation surface 25.

The conventional latent heat storage type heating-devices utilizing supercooling phenomena have been proposed in order to compensate a time lag between generation and emission of heat. This is a primary purpose of heat storage. In practice, the function of the devices is liable to stop, due to phase-segregation. Moreover, such a significant difference as expected can not be attained between the melting point and the nucleation temperature (hereinafter, the difference will be referred to as a degree of supercooling in this specification). Thus, the latent heat storage type heating-devices can not be subjected to industrial applications.

That is, in the above-described respective latent heat storage heating-devices, a heat-storing material capable of being supercooled is filled into a large container.

Molecules with different masses are present in the liquid formed by melting the heat-storing material. Molecules with higher masses precipitate downward against the Brownian motion, so that the molecules with higher masses and the molecules with lower masses tend to be segregated from each other. Therefore, as a container for a heat-storing material has a larger length in the direction of gravity, it is more difficult to restore the heavy and light molecules which are separated from each other and react with each other. After the phase-segregation, the melting points and the solidifying temperatures inherent in the respective separated substances appear. Accordingly, in the above-described conventional example, the primary function of the heat-storing material, that is, the melting (solidification) at a particular melting point can not be performed, due to the phase-separation. Moreover, the frequency at which crystal nuclei are formed per unit time and unit volume is determined by the temperature. On the other hand, if nuclei are formed at one site in the heat-storing material, the formation triggers the solidification of the heat-storing material, irrespective of the volume of the heat-storing material. Accordingly, the probability at which the heat-storing material having a predetermined volume is solidified is defined as the product of the volume of the heat-storing material and the frequency of formation of crystal nuclei per unit time and unit volume.

Accordingly, as the volume of the heat-storing material becomes larger at a constant temperature, nuclei are formed more readily, and the degree of supercooling is decreased. For this reason, in the conventional example, such a high supercooling as expected can not be attained, as described above. Thus, the industrial use of the latent heat storage type heating device has not been realized with much troubles.

SUMMARY OF THE INVENTION

It is an object of the present invention to provide a heat-storage type heater which solves the above-described conventional problems and can completely compensate a time lag between the input and output of heat, which is a purpose inherent in heat-storage, and to provide a method of controlling the input and output of heat.

Also, it is an object of the present invention to provide a heat-storage type heater by which a desired degree of supercooling can be obtained without the function being stopped due to the phase separation and to provide a method of controlling the input and output of heat.

To achieve the above-described objects, a heat-storage type heater in accordance with the present invention comprises means for supplying heat to a heat-storing material capable of being supercooled, the heat-storing material, together with a phase-segregation preventive agent, being filled into a plurality of small containers, means for releasing the supercooled state of the heat-storing material, and a heat radiation surface.

The means for releasing the supercooled state may comprise a heat exchanger which is disposed so as to be in contact with the containers for the heat-storing material, and circulates a fluid, a thermoelectric element disposed so as to be in contact with the containers for the heat-storing material, a vibrator disposed so as to be in contact with the containers for the heat-storing material, or electrodes disposed so as to be in contact with the containers for the heat-storing material.

Moreover, a heat-storage type heater in accordance with the present invention comprises means for supplying heat to a heat-storing material capable of being supercooled, the heat-storing material being filled into a plurality of small containers together with a phase-segregation preventive agent, and a heat radiation surface. In this case, preferably, the heat-storing material capable of being supercooled spontaneously starts to be solidified at a predetermined temperature in the supercooled state thereof.

Preferably, the small containers have a shape having a smaller size in the gravity direction or a shape elongated in the horizontal direction. The means for supplying heat to the heat-storing material may comprise a heat exchanger which circulates a fluid therein, or an electric heater. Moreover, the surface of the heat-storage type heater except for the heat radiation surface may be covered with a heat insulating material, or the heat-storage type heater may further comprises means for causing forced convection of a fluid on the heat radiation surface so that the heat radiation is accelerated.

The above-described heat-storage type heater can be effectively used for a floor heating system.

Moreover, a method of controlling the input and output of heat to and from a heat-storing material in accordance with the present invention comprises the steps of externally supplying heat energy to the heat-storing material capable of being supercooled and filled into a plurality of small containers together with a phase-separation preventive agent by use of means for supplying heat, whereby the heat-storing material is melted, maintaining the heat-storing material in the supercooled state by emission of heat, and when the stored thermal energy is required, releasing the supercooled state of the heat-storing material by use of means for releasing the supercooled state of the heat-storing material, or allowing the heat-storing material to be spontaneously solidified at a predetermined temperature, whereby the heat at the melting point is generated. When the means for releasing the supercooled state of the heat-storing material is used, the time at which the supercooled state of the plurality of the heat-storing materials can be controlled individually for the heat-storing materials.

Moreover, according to a method of controlling the input and output of heat to and from the above-described heat-storage type heater in accordance with the present invention, after emission of heat from the heat radiation surface of the heat-storage type heater and melting of the heat-storing material are carried out in the heat-storage type heater, the period from the first time at which the means for supplying heat to the heat-storing material is stopped after the emission of heat from the heat radiation surface of the heat-storage type heater and the melting of the heat-storing material are carried out, till the second time at which the heat-storage type heater spontaneously starts to be solidified can be set by using a heat transmittance via the heat radiation surface and the thermal insulating material, and the thermal properties, mass (here, the mass functions as a factor for determining the volume and also as a factor for determining the heat capacitance), and temperature of the heat-storing material.

The heat-storing material (hydrates) capable of being supercooled employed in the present invention has high efflorescent and deliquescent properties and remarkably presents the above-described phase-segregation. Thus, the heat-storage type heater and the heat-storage device can not be realized, if means for tightly closing the heat-storing material for a long time and means for preventing the phase-segregation for a long period are not used. Moreover, as the volume of the heat-storing material becomes larger, it is more difficult from the standpoint of the strength to produce a container for containing the heat-storing material tightly for a long time. Accordingly, the size of the container in the gravity direction needs to be increased, which will cause the phase-segregation.

In the heat-storage type heater in accordance with the present invention, the heat-storing material capable of being supercooled, together with the phase-segregation preventive agent, is contained in a plurality of the small containers. Accordingly, the heat-storing material can be enclosed easily and tightly for a long time. The efflorescence and the deliquescence of the heat-storing material can be easily suppressed. Heavy molecules and light molecules in the heat-storing material separated by melting are further separated from each other in the vertical direction, due to the difference in gravity between the molecules. This motion is suppressed by the added phase-separation preventive agent, and moreover, the reduced size in the gravity direction prevents the thickness of the separation layer from increasing. Thus, the separation can be easily solved. Accordingly, according to the heat-storage type heater of the present invention, the phase-separation of the heat-storage type heater can be prevented from a long time.

The experiment by the inventor has revealed that the degree of supercooling, which is most important for this heat storage system, depends on the volume of the heat-storing material; and as the volume of the heat-storage type heater becomes larger, the degree of supercooling becomes smaller, so that advantages obtained by utilizing the supercooling phenomenon are deteriorated. According to the present invention, the heat-storage type heater is filled into a plurality of the small containers. Thus, the volumes of the heat-storing materials in the respective containers are small, and the frequency per unit time at which crystal nuclei are formed is small. Thus, the heat-storing material is stored while it has a high degree of supercooling. Such high supercooling phenomenon as have not been realized according to conventional propositions can be stably obtained for a long time.

DESCRIPTION OF EMBODIMENTS

Figure 1:
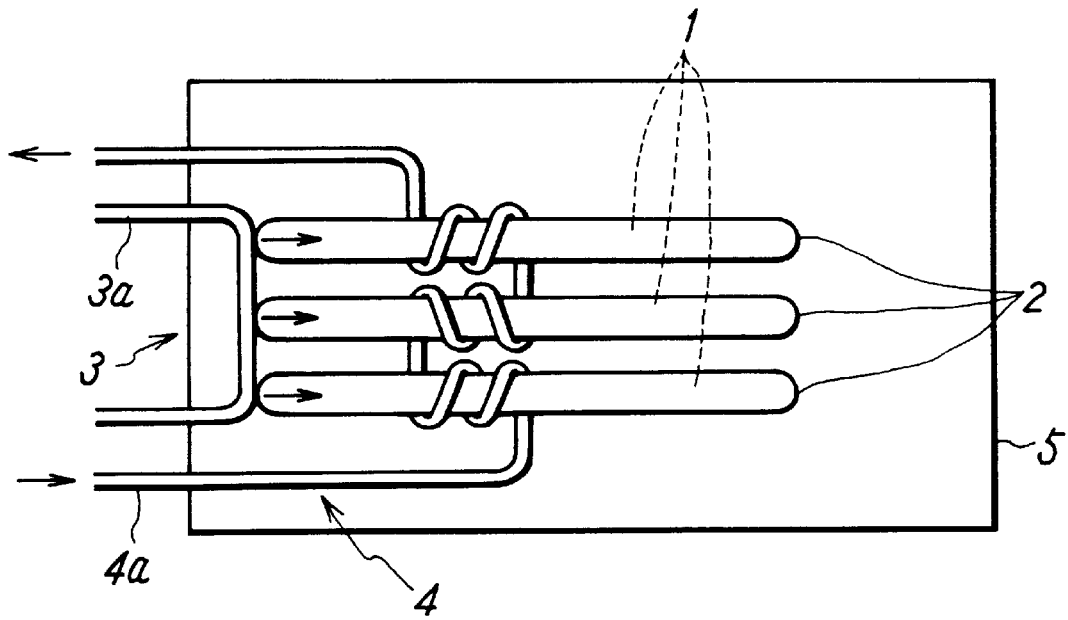
FIG. 1 illustrates the structure of a heat storage type heater according to a first embodiment of the present invention.

FIG. 1 shows the structure of a heat-storage type heater according to a first embodiment of the present invention. In this figure, an outer enclosing member 5 of the heat-storage type heater may be made of an optional material corresponding to uses thereof. The outer surface of the member 5 is a thermal radiation surface through which heat from the heat-storage type heater is radiated. A heat-storing material 1 capable of being supercooled can be selected from various materials which can be selected from materials which present significant supercooling phenomena, corresponding to required temperatures and degrees of supercooling. As regards the degree of supercooling, it is known that disodium hydrogen phosphate dodecahydrate ($Na_2HPO_4.12H_2O$) has a solidifying point of about 36° C., and a nucleation temperature of from about 0° C. to about 36° C. Sodium acetate trihydrate ($CH_3COONa.3H_2O$) has a solidifying point of about 58° C., and a nucleation temperature of from about −20° C. to about 58° C. (the nucleation temperature varies depending on the volume of the heat-storing material).

Small-sized containers 2 into which the above-described heat-storing material 1 is filled needs to have a pressure durability against the thermal expansion of the heat-storing material. In this embodiment, means 3 for releasing the supercooled state comprises a pipe 3a through which a low temperature fluid such as air, water, ethylene glycol, ethanol, or the like passes. The pipe 3a is disposed so as to be in direct contact with a part of the container 2. The pipe 3a may be disposed so as to be in direct contact with the heat-storing material 1. As regards a heat exchanger 4a used as means 4 for supplying heat to the heat-storage type heater, the pipe thereof through which a fluid (liquid such as water, alcohol, molten metal, or the like, and a gas as air, steam, an inert gas, or the like) passes is connected to a heat source. The fluid is circulated for supply of heat. The container 2 and the heat exchanger 4a may be thermally connected to each other.

Materials suitable for use as the above-described heat-storing material 1 and having significant supercooling phenomena include sodium sulfate decahydrate ($Na_2SO_4.10H_2O$), sodium carbonate decahydrate ($Na_2CO_3.10H_2O$) sodium thiosulfate pentahydrate ($Na_2S_2O_3.5H_2O$), magnesium chloride hexahydrate ($MgCl_2.6H_2O$), aluminum sulfate decahydrate ($Al_2(SO_4)_3.10H_2O$) magnesium nitrate hexahydrate ($Mg(NO3)_2.6H_2O$), aluminum ammonium sulfate dodecahydrate ($NH_4Al(SO_4)_2.12H_2O$) aluminum potassium sulfate dodecahydrate ($KAl(SO_4)_2.12H_2O$), nickel(II) nitrate hexahydrate ($Ni(NO_3)_2.6H_2O$), calcium chloride hexahydrate ($CaI_2.6H_2O$), calcium carbonate hexahydrate ($CaCO_3.6H_2O$), pottasium fluoride tetrahydrate ($KF.4H_2O$), polyhydric alcohols such as mannitol ($HOCH_2(CHOH)_4CH_2OH$), and so forth. The heat-storing material 1 is not limited to these materials.

As a phase-segregation preventive agent, clay, polysaccharides, paste, animal or vegetable fibers, liquid-absorptive resins, or the like is added to the heat-storing material 1. As the polysaccharides and the paste, various materials such as almond gum, aeromonas gum, acacia gum, azotobacter vinelandi gum, linseed extract, gum Arabic, arabinogalactan, alginic acid, sodium alginate, aloevera extract, welan gum, erwinia mitsuensis gum, elemi gum, enterobactor simanas' gum, enterobactor gum, okra extract, curdlan, algae cellulose, cassia gum, casein, sodium caseinate, phaeophyta extract, gum gatti, carrageenan, karaya gum, calcium carboxy methyl cellulose, sodium carboxy methyl cellulose, carob bean gum, xanthan gum, aloe arborescens extract, chitin, chitosan, guar gum, lignum vitae resin, stearyl citrate, glucosamine, gluten, gluten decomposition products, kelp extract, yeast cell membranes, kelp mucilagae, psyllium seed gum, psyllium husk, acid casein, xanthan gum, gellan gum, sclero gum, sodium stearyl lactate, sesbania gum, calcium carboxymethyl cellulose, sodium carboxymethyl cellulose, tamarind gum, tara gum, dammar resin, dextran, sodium carboxymethyl starch, sodium starch phosphate, gum tragacanth, triacanthos gum, abelmoschusmanihot medicus, bacillus natto mucilage, bacillus natto gum, sodium lactate, microcrystalline cellulose, hydroxypropylmethyl cellulose, hydroxypropyl cellulose, sodium pyrophosphate, tetrasodim pyrophosphate, sodium dihydrogen pyrophosphate, furcellaran, glucose polysaccharides, fructan, pullulan, pectin, rhodophyceae extract, ammonium phosphatidate, sodium polyacrylate, polyoxyethylene(20)sorbitan tristearate, polyoxyethylene(20)sorbitan monooleate, polyoxyethylene(20)sorbitan monostearate, polyoxyethylene(20)sorbitan monopalmitate, polyoxyethylene(20)sorbitan monolaurate, polyoxyethylene(40)stearate, polyoxyethylene(8)stearate, polysorbate(20), polysorbate(40), polysorbate(65), polysorbate(80), polyvinylpyrrolidone, macrophomoran gum, mannan, methyl cellulose, rhamsan gum, levan, rennet casein, locust bean gum, CMC, and so forth may be employed. As the animal or vegetable fibers, feathers, wool, raw cotton, synthetic fibers, or the like may be employed. As the liquid-absorptive resin, starch—acrylonitrile graft-polymer hydrolyzates, starch—acrylic salt crosslinking products, carboxy methyl cellulose crosslinking products, saponification products of a methyl acrylate—vinyl acetate copolymer, crosslinking products of an acrylic polymer salt, or the like may be used. Due to the addition of the phase-segregation preventive material, the heat-storing material 1 can be used repeatedly and stably.

Suitably, the container 2 has a volume as small as possible. This serves to eliminate effects of the efflorescence, deliquescence, and phase segregation of the heat-storing material 1 for a long time, and enables the degree of supercooling to be stably maintained on a high level. For example, in the case in which the disodium hydrogen phosphate dodecahydrate is used and the volume of the container is about 10 mL, the degree of supercooling is about 15° C., while the degree of supercooling is about 10° C. for the volume of about 1L. Thus, the volume of the container 2 which is suitable for practical use is up to about several liters. The shape of the container 2 is optional. If the container 2 has a shape elongated in the horizontal direction, as shown in FIG. 1, advantageously, the number per unit volume of the heat-storing material 1 of contacts between the containers 2 and the means 3 for releasing the supercooled state can be reduced, and moreover, the segregation can be prevented.

According to the heat-storage type heater configured as described above, when supply of heat to an object to be heated is required, first, heat is supplied to the heat-storage type heater via the heat exchanger 4a. The heat supplied to the heat-storage type heater is radiated via the heat-radiation surface of the heat-storage type heater to the heating object, and simultaneously, is supplied to the heat-storing material 1. After the temperature of the heat-storing material 1 reaches the melting point, the heat-storing material 1 is melted so that the phase is changed from solid to liquid. After the supply of heat via the heat exchanger 4a is stopped, heat-transfer from the heat-storing material 1 to the heating object is caused, so that the temperature of the heat-storing material 1 decreases. However, since the heat-storing material 1 can be supercooled, the phase of the heat-storing material 1 does not become solid, though the temperature of the heat-storing material 1 decreases. Thus, the heat-storing material 1 remains the supercooled liquid. The sensible heat of the heat-storing material 1 in the liquid phase is supplied to the heating object till the temperature of the heat-storing material 1 becomes equal to that of the heating object. Accordingly, the heat can be output for a longer time than the time period in which the heat exchanger 4a supplies the heat. The heat-storing material 1 of which the temperature becomes equal to that of the heating object is stored in the state of the supercooled liquid. After this, if heat needs to be supplied to the heating object again, a low temperature fluid is made to pass through means 3 for releasing the supercooled state. In this case, the temperature of the low temperature fluid is set to be lower than the temperature at which crystal nuclei can be formed in the heat-storing material 1 in the supercooled state. For this purpose, such an amount of the low temperature fluid as is required to crystallize a slight portion of the heat-storing material 1, that is, a small amount of the fluid is used. Minute crystals formed due to the low temperature fluid become crystal nuclei, which cause crystals to grow in the whole of the heat-storing material 1. Thus, the solidification starts. The temperature of the heat-storing material 1 after the crystal growth starts is recovered to the melting point, and the heat at the melting point is radiated from the heat radiation surface.

In particular, according to the above-described heat-storage type heater, the second heat radiation, that is, the thermal radiation carried out every even time in the case in which the thermal radiation cycle is repeated a plurality of times, can be realized by using a small amount of heat for cooling which induces the crystallization of the heat-storing material 1, even if no heat is externally supplied from the heat exchanger 4a. Thus, the heat supplied in the limited time-period can be effectively used by utilizing the function inherent in the heat storage, that is, by outputting the heat a predetermined time after the heat is input.

The operation of the heat-storage type heater described above is effectively contributed to the phase-segregation preventive agent added to the heat-storing material, and moreover, the material and the agent contained in a plurality of the small containers.

Figure 2:
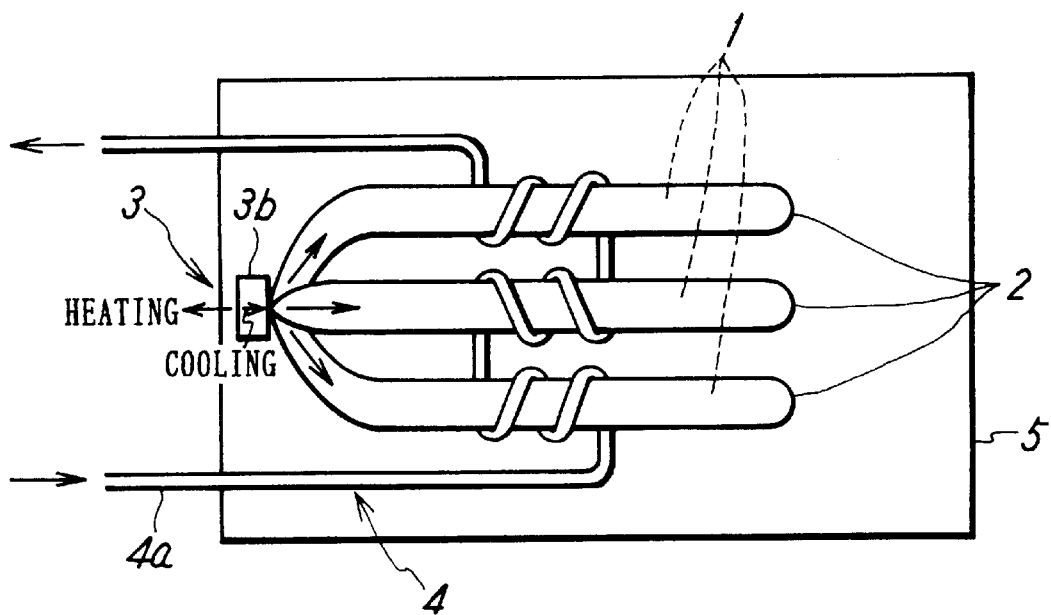
FIG. 2 illustrates the structure of a heat storage type heater according to a second embodiment of the present invention.

FIG. 2 shows the structure of a heat-storage type heater according to a second embodiment of the present invention. In this figure, the same or equivalent parts to those of the first embodiment are designated by the same reference numerals, and the same description as that in the first embodiment is applied. The means 3 for releasing the supercooled state in the second embodiment is a thermoelectric element 3b disposed so as to be in contact with the heat-storing material 1 or the container 2. The thermoelectric element 3b functions so that when a predetermined voltage is applied thereto, the side of the element 3b near the heat-storing material 1 is cooled, and the opposite side thereof is heated. The supercooled state can be released by using a less number of the thermoelectric elements 3b, when the containers 2 each have an elongated shape, and an appropriate number of portions of the containers 2 are set to be adjacent to each other as shown in FIG. 2.

The operation of the heat-storage type heater of the second embodiment is almost the same as that of the first embodiment. Thus, the part of the operation different from that of the first embodiment, that is, the method of releasing the supercooled state by means of the thermoelectric elements will be described. When a voltage is applied to the thermoelectric element 3b, a part of the side near the heat-storing material 1 of the thermoelectric element 3b is cooled, and the side of the thermoelectric element 3b distant from the containers 2 is heated. When the temperature of a part of the heat-storing material 1 in the supercooled state reaches the temperature at which crystal nuclei can be formed, crystal nuclei are formed and triggers the solidification of the heat-storing material 1, so that the heat at the melting point is emitted.

In the heat-storage type heater of the second embodiment, the heat emission carried out every even time in the case in which the heat emission cycle is repeated a plurality of times can be realized simply by inducing the crystallization of the heat-storing material 1, similarly to the first embodiment.

Figure 3:
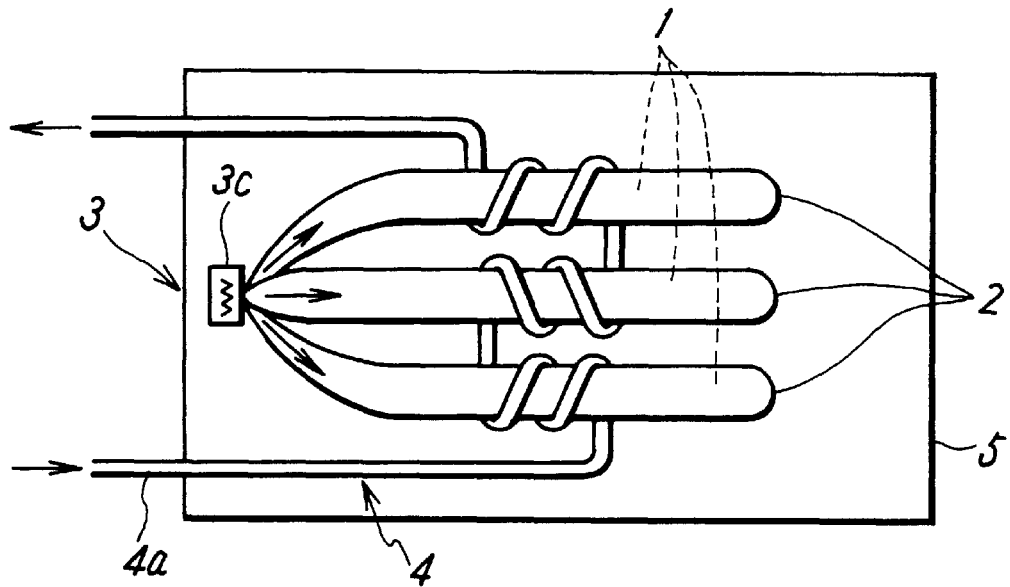
FIG. 3 illustrates the structure of a heat storage type heater according to a third embodiment of the present invention.

FIG. 3 shows the structure of the heat-storage type heater according to a third embodiment of the present invention. In this figure, the same or equivalent parts to those of the first embodiment are designated by the same reference numerals, and the same description as that of the first embodiment is applied. As the means 3 for releasing the supercooled state in the third embodiment, a disturbing device 3c is used. The disturbing device 3c changes the positions of a part of molecules in the heat-storing material 1 externally and forcedly to induce the crystallization. As the disturbing device 3c, devices utilizing vibration by a vibrator, stirring by a stirrer, squeezing or collision by a slider, and the like may be employed. Various systems may be used for the stirring, the vibration, the squeezing, and the collision. For example, for the vibration, devices such as piezoelectric elements which are directly vibrated in the containers 2, or devices such as electromotive vibrators which transmit vibration generated outside the containers 2 to the inside of the containers 2 may be used. The vibration principles and the structures are not restrictive. The supercooled state can be released by means of a less number of the thermoelectric elements 3b, when the containers 2 each have an elongated shape, and an appropriate number of portions of the containers 2 are set to be adjacent to each other as shown in FIG. 3.

Also, in the heat-storage type heater of the third embodiment using the disturbing device 3c, the heat emission to be applied every an even number of times in the case in which the heat emission cycle is repeated a plurality of times can be realized simply by inducing the crystallization of the heat-storing material 1, though no heat is externally supplied, similarly to the first embodiment. Thus, the heat supplied in the limited time-period can be effectively applied by utilizing the function inherent in the heat storage, that is, the compensation of a time lag between the generation and the emission of heat.

As the heat exchange 4a used in the first to third embodiments, an electric heater which electrically inputs heat may be employed.

Figure 4:
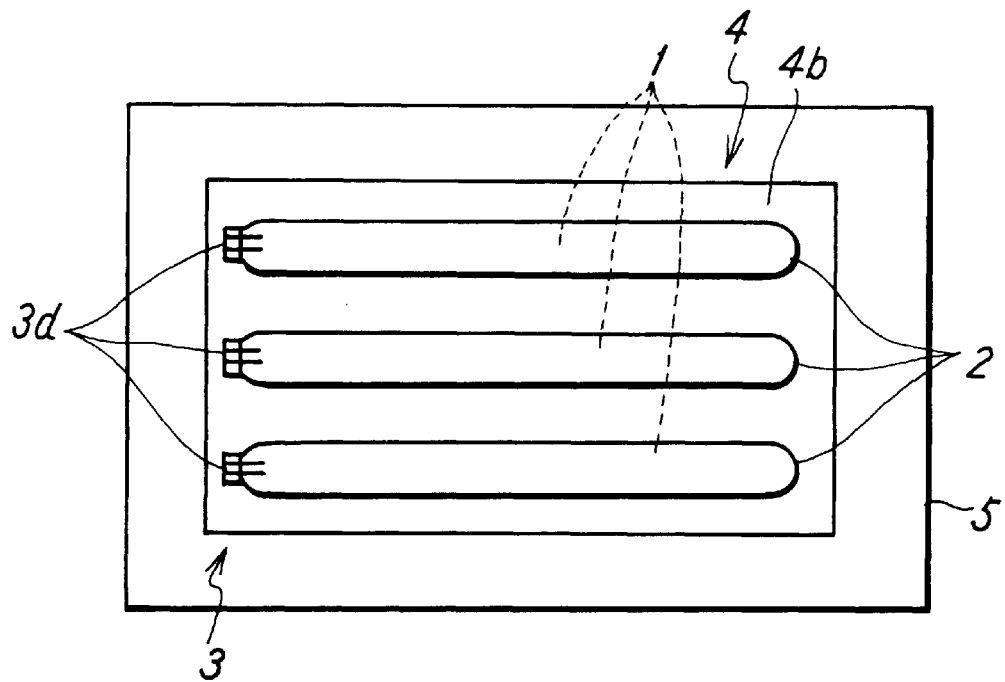
FIG. 4 illustrates the structure of a heat storage type heater according to a fourth embodiment of the present invention.

FIG. 4 shows the structure of a heat-storage type heater according to a fourth embodiment of the present invention. In this figure, the same or equivalent parts to those of the first embodiment are designated by the same reference numerals, and the same description as that in the first embodiment is applied. In the fourth embodiment, an electric heater 4b is used as the means 4 for supplying heat to the heat-storing material 1, instead of the heat exchanger 4a in the first embodiment (FIG. 1). The electric heater 4b, when a voltage is externally applied thereto, supplies heat to the heat-storing material 1. The electric heater 4b may have different shapes such as linear surfaces or flat and curved surfaces, corresponding to the shapes and functions of the heat-storing material 1 and the container 2.

In this embodiment, electrodes 3d are provided as the means 3 for releasing the supercooled state. Electrodes 3d, when a voltasge is applied thereto, give an electrical force to a part of the heat-storing material 1 so that a molecular cluster having a size larger than the radius of the critical nucleus is formed, or spark discharge is caused to change the positions of molecules in the heat-storing material 1 externally and forcedly, whereby the crystallization is induced.

Also, in the case in which the above-described electrodes 3d are used, the heat emission can be applied every an even number of times in the case in which the heat emission cycle is repeated a plurality of times simply by using a small electric power to induce the crystallization of the heat-storing material 1, though no heat is externally supplied thereto.

The electric heater 4b used in the fourth embodiment may be a device equivalent to the heat exchanger 4a shown in FIG. 1 through which a fluid is passed to exchange heat with the outside thereof. Moreover, the electrodes 3d disposed in the respective containers 2 as the means 3 for releasing the supercooled state may be independently controlled, so that the timing of solidification of a heat-storing materials 1 is differentiated from that of another heat-storing material 1. Thus, the emission amount and time of heat from the heat-storage type heater, obtained by the solidification of the heat-storing material 1 can be controlled. This can be also realized in the first to third embodiments, if necessary.

Figure 5:
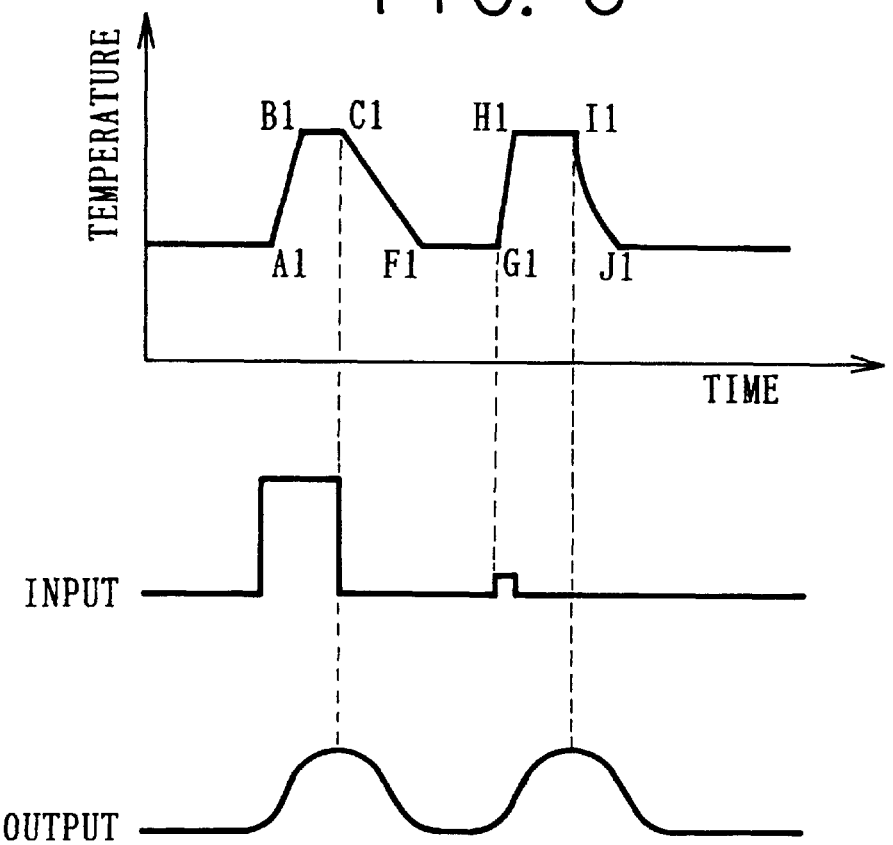
FIG. 5 graphically represents relations between the temperatures of the heat-storing materials of the first to fourth embodiments and the passage of time.

FIG. 5 shows relations between the temperature of the heat-storing material 1 in the heat-storage type heater of the first to fourth embodiments and the time and between the inputting and outputting of heat.

The heat-storing material 1 of which the temperature is equal to that of an object to be heated starts to receive, at time A1, heat from the means 4 for supplying heat to the heat-storing material. The temperature of the heat-storing material 1 rises gradually while the heat-storing material remains in the solid phase. The temperature of the heat-storing material reaches the melting point at time B1, when the heat-storing material starts to melt. The temperature of the heat-storing material is kept constant while it is being melted. After the melting is completed, the supply of heat from the means 4 for supplying heat is stopped at time C1. The heat-storing material 1 capable of being supercooled does not start the solidification immediately after the supply of heat is stopped. The temperature of the heat-storing material 1 decreases while the heat-storing material 1 remains in the liquid phase, emitting the sensible heat. Thereafter, at time F1, the temperature of the heat-storing material in the liquid phase decreases to be equal to the temperature thereof before the heat is input. Then, the transfer of heat from the heat-storing material 1, that is, the heat storage type heater to the heating object is stopped. After the time F1, the heat-storing material, while it remains the supercooled liquid, is stored in the supercooled liquid for a time till the nucleation operation described later.

After the passage of time, when it is required to supply heat to the heating object at time G1 again, a slight portion of the heat-storing material 1 is cooled to the temperature at which the solidification of the slight portion of the heat-storing material 1 starts, or a slight portion of the heat-storing material 1 is vibrated by using the means 3 for releasing the supercooled state of the heat-storing material. Then, molecules in the slight portion of the heat-storing material are oriented so that crystal nuclei are formed. Thus, crystals are grown in the heat-storing material. That is, the solidification starts. After the solidification starts, the potential energy of the supercooled liquid is emitted, so that the kinetic energy of the atoms or molecules of the heat-storing material is increased. Thus, the temperature of heat-storing material is recovered to the solidifying point (time H1). In the solidifying process, the phase of the heat-storing material changes from liquid to solid at a constant temperature, that is, the melting point (solidifying point) thereof while the latent heat is being emitted. After the solidification is completed at time I1, the temperature of the heat-storing material decreases again while the sensible heat is being emitted. At time J1, the temperature of the heat-storing material becomes equal to that of the heating object. Then, the thermal radiation is completed. One cycle of the operation of the heat-storage type heater comprises the process from A1 to J1. After the second operation, the same cycle from A1 to J1 as that of the first cycle is repeated.

The means 3 for releasing the supercooled state is provided in the first to fourth embodiments. If a material capable of spontaneously starting to be solidified at a predetermined temperature in the supercooled state is selected as the heat-storing material capable of being supercooled, the supercooling can be induced, that is, the solidification can be started, even if the means 3 for releasing the supercooled state is not provided.

Figure 6:
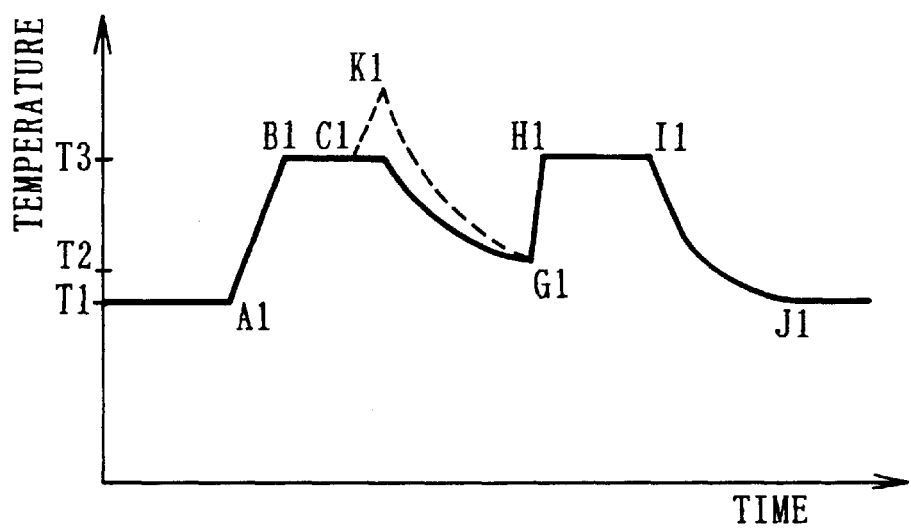
FIG. 6 graphically represents a relation between the temperature of the heat-storing material according to a fifth embodiment of the present invention not using means for releasing the supercooled state and the passage of time.

FIG. 6 shows a relation between the temperature of such a heat-storing material used in the fifth embodiment and the time. This relation will be described with reference to the structure of the heat-storage type heater of the first embodiment shown in FIG. 1. First, when heat needs to be supplied to an object to be heated, heat is supplied to the heat-storage type heater via the heat exchanger 4a. Thus, the heat is supplied to the heating object and the heat-storing material 1. The heat-storing material 1 of which the initial temperature T1 is equal to that of the heating object starts to be heated at the time A1, due to the supply of heat from the heat exchanger 4a. After the temperature of the heat-storing material 1 rises to the melting point T3 at the time B1, the heat-storing material 1 is melted while the phase is changed from solid to liquid. After the supply of heat from the heat exchanger 4a is stopped at time K1, transfer of heat from the heat-storing material 1 to the heating object is caused, so that the temperature of the heat-storing material 1 decreases. The phase of the heat-storing material 1, which is capable of being supercooled, does not become solid, although the temperature decreases. That is, the heat-storing material 1 remains the supercooled liquid. In this case, if a material having a nucleation temperature T2 between the temperatures T1 and T3 is selected as the heat-storing material 1, the heat-storing material 1 has the nucleation temperature T2 at the time G1 before the temperature decreases to reach the temperature of the heating object. Then, the heat-storing material 1 spontaneously starts to be solidified.

For example, if the above-described disodium hydrogen phosphate dodecahydrate is applied as the heat-storing material 1 for floor heating, the temperature T3 is 36° C., the temperature T2 is in the range from 23 to 28° C., and the temperature T1 is up to 20° C. Thus, the above-described conditions can be easily realized. After the solidification is started at the time G1, the temperature of the heat-storing material 1 is recovered to the melting point T3 at the time H1, and the material 1 radiates heat at the melting point via the heat radiation surface. The solidification progresses till the time I1. Then, the entire phase of the heat-storing material 1 is solid. The heat-storing material 1 in the solid state emits the sensible heat till the time J1 when the heat-storing material 1 has a temperature equal to the temperature T1 of the heating object.

That is, in the heat-storage type heater of the fifth embodiment, the heat emission to be applied every second time, namely, every even number of times in the case in which the heat emission cycle is repeated a plurality of times can be realized without external control being carried out. That is, the heat supplied in the limited time period can be effectively used by utilizing the function inherent in the heat storage, namely, the compensation of a time lag between the inputting and the outputting of heat, simply with a small amount of energy.

The temperature t of the heat-storage type heater at the time after a time-period t from the time $K_1$ can be approximated by the following equation.

$$T = T_0 - \left\{ a_1 k_1 \int_{K_1}^{K_1+t} (T-T_4) dt + a_2 k_2 \int_{K_1}^{K_1+t} (T-T_s) dt \right\}$$

In which $a_1$ is the area of the heat radiation surface, $a_2$ is the area of the surface of the heat-storage type heater excluding the heat radiation surface $k_1$ is the heat transfer coefficient between the heat-storage type heater and the heating object positioned on the thermal radiation surface side of the heater, $k_2$ is the heat transfer coefficient between the heat-storage type heater and the environment positioned on the sides of the heat-storage type heater excluding the thermal radiation surface side thereof, m is the composite mass of the heat-storing material 1 and the constitutional elements excluding the heat-storing material 1, c is the composite specific heat of the heat-storing material 1 and the constitutional elements excluding the heat-storing material 1 in the liquid phase, $T_0$ is the initial temperature of the heat-storing material, $T_4$ is the temperature of the heating object on the side thereof near the thermal radiation surface, and $T_5$ is the temperature of the environment positioned on the sides of the heat-storage type heater excluding the thermal radiation surface side. In particular, the time-period $(G_1-K_1)$ which it takes for the temperature T to become the nucleation temperature $T_2$ is determined by the mass (m) and the specific heat (c) of the heat-storing material 1 and the other constitutional materials, the areas $(a_1, a_2)$ of the thermal radiation surface and the other surface, the thermal insulating characteristics $(k_1, k_2)$ of the heat-storage type heater, the initial temperature $(T_0)$ of the heat-storing material 1, the temperatures $(T_4, T_5)$ of the heating object and the environment, and so forth as parameters. The mass m, the specific heat c, the surface areas $a_1$ and $a_2$, and the insulating characteristics $k_1$ and $k_2$ are parameters inherent in the device, and can be appropriately set when the device is designed.

The temperatures $T_4$ and $T_5$ are parameters which vary corresponding to the use conditions. As seen in the equation (1), as the temperatures $T_4$ and $T_5$ becomes lower, the time period T, that is, the time period from the time $K_1$ to the next nucleation becomes shorter. On the other hand, as the temperatures $T_4$ and $T_5$ becomes higher, the time period T, that is, the time period from the time $K_1$ to the next nucleation becomes longer. The time period T can be varied as follows, corresponding to the variation of the temperatures $T_4$ and $T_5$. The variation of the temperatures $T_4$ and $T_5$ is previously estimated, and the heating is continued a short time after the time $K_1$, or the temperature of heat supplied from the heat exchanger 4 for a time from $C_1$ to $K_1$ as shown by the broken line in FIG. 6 is adjusted, that is, the initial temperature $T_0$ of the heat-storing material 1 at the time $K_1$ is adjusted.

Hereinafter, a method of adjusting the initial temperature $T_0$ so as to make the time T constant even if the temperatures $T_4$ and $T_5$ are lower than those in the above-described example. Heat is input at the time A1 indicated in FIG. 6, so that the temperature of the heat-storing material 1 is increased. The phase of the heat-storing material 1, when it reaches the melting point at the time $B_1$, is changed from solid to liquid. At the time $C_1$ at which all the heat-storing material 1 has been changed into the liquid phase, the inputting of heat is completed in the first to fourth embodiments. On the other hand, heat continues to be input in this embodiment. Accordingly, the temperature of the heat-storing material 1 further continues to rise, and a maximum is formed at the time $K_1$ at which the inputting of heat is completed. After this, the temperature of the heat-storing material 1 decreases while the material 1 is in the liquid phase. Since the temperatures $T_4$ and $T_5$ are lower than those in the above-described example, the decrease in temperature of the heat-storing material 1 from $T_0$ to $T_2$ is more rapid than that in the above-described example. On the other hand, since the initial temperature $T_0$ is higher than that in the above-described example, the time at which the heat-storing material 1 reaches the temperature $T_2$, that is, the nucleation temperature of the heat-storing material 1 in the supercooled state, can be set at the temperature G1, similarly to the above-described example. Needless to say, the above-described setting can be achieved by using the means for supplying heat so that the heat-storing material 1 has a temperature higher than the nucleation temperature $T_2$ at time within the range from $K_1$ to $G_1$. On the other hand, in the case in which the temperatures $T_4$ and $T_5$ are higher than the designed values, the temperature of the heat-storing material 1 at the time $G_1$ can be set at the temperature $T_2$ in the following manner. The heating is stopped before the time $K_1$, or the temperature $T_0$ is set to be higher than the temperature $T_3$ when the temperatures $T_4$ and $T_5$ have the designed values, and further, the temperature $T_0$ is made to approach the temperature $T_3$. Thus, the above-described situations can be coped with. Moreover, the time $G_1$ may be deliberately adjusted as follows. That is, the time $G_1$ is previously estimated, and the initial temperature $T_0$ of the heat-storing material 1 at the time $K_1$ is adjusted, or heat is supplied to the heat-storing material 1 so that the temperature of the heat-storing material 1 exceeds the temperature $T_2$ till the time $G_1$. Thus, after the temperature of the heat-storing material 1 becomes lower than the recrystallization temperature at the time $G_1$, the recrystallization of the heat-storing material 1 starts. As described above, the time period which it takes for one cycle to be performed can be deliberately changed. That is, according to the above-described utilization methods, no means for nucleation is needed, and the device can be prevented from become complicated, in contrast to the first to fourth embodiments.

Such means for releasing the supercool state as employed in the first to fourth embodiments may be provided in this embodiment. If the means for releasing the supercooled state is provided, such urgent demand for heat as can not be coped with by the adjustment according to this embodiment can be satisfied by operating the means for releasing the supercooled state.

Figure 7:
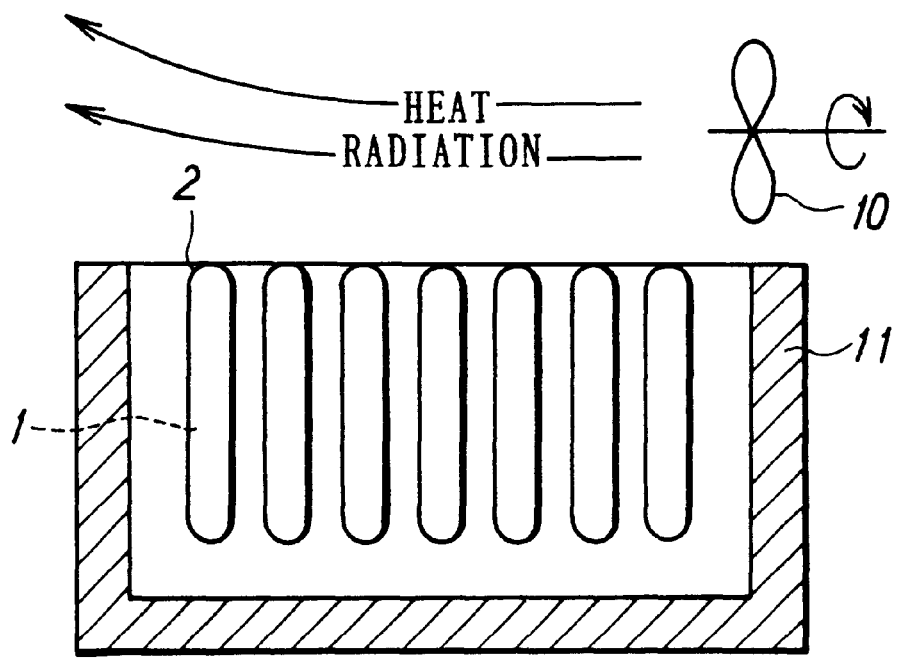
FIG. 7 illustrates the structure of the heat storage type heater according to the present invention.

FIG. 7 illustrates a utilization embodiment of the heat-storage type heater of the present invention. This figure shows a plurality of small containers 2 filled with the heat-storing material 1 capable of being supercooled, similarly to the embodiments shown in FIGS. 1 to 4. The means for supplying heat to the heat-storing material 1, the means for releasing the supercooled state, and so forth are not shown in this figure. An appropriate combination of these means may be applied as described in the first to fifth embodiments.

A fan 10 is disposed so as to cause forced convection on the thermal radiation surface of the outer casing 5. A thermal insulating member 11 is provided for the part of the outer casing 5 excluding the thermal radiation surface.

Since the fan 10 is provided on the heat radiation surface of the outer casing 5 in the heat-storage type heater configured as described above, heat transfer by the forced convection is caused, so that great thermal radiation to the heating object can be achieved, and moreover, the thermal radiation amount can be controlled by adjusting the rotating speed of the fan 10.

Figure 8:
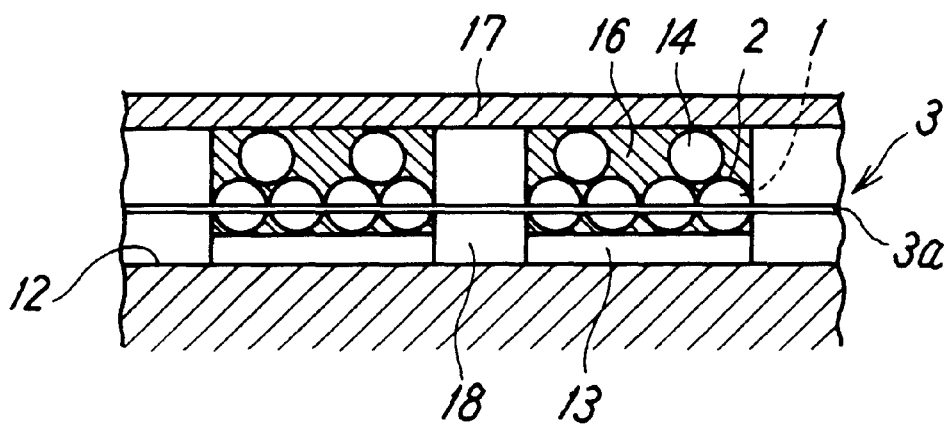
FIG. 8 is a cross-sectional view showing the structure of a floor heating system as an example in which the heat-storage type heater of the first embodiment of the present invention is used.
Figure 9:
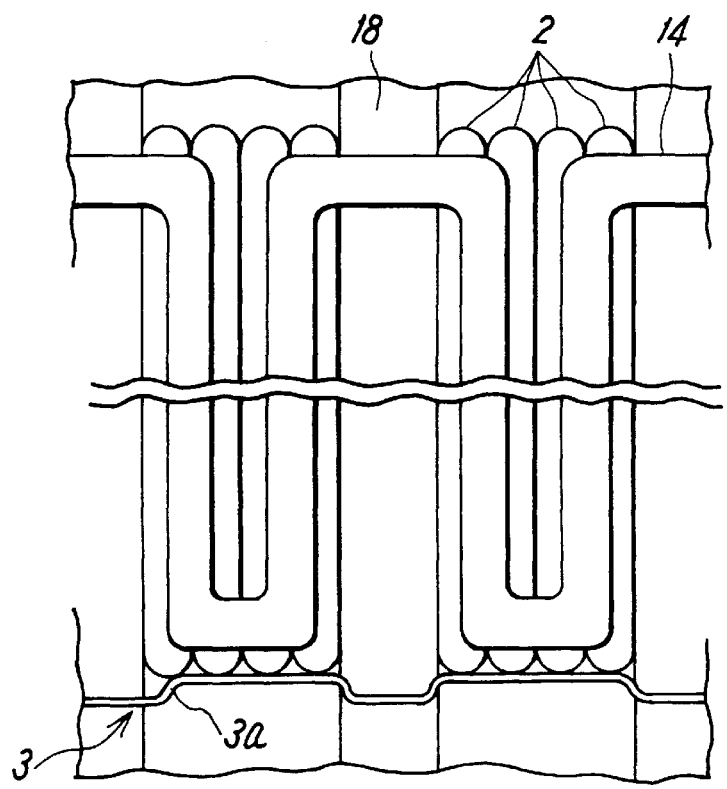
FIG. 9 is a partially cutaway plan view of the floor heating system.
Figure 10:
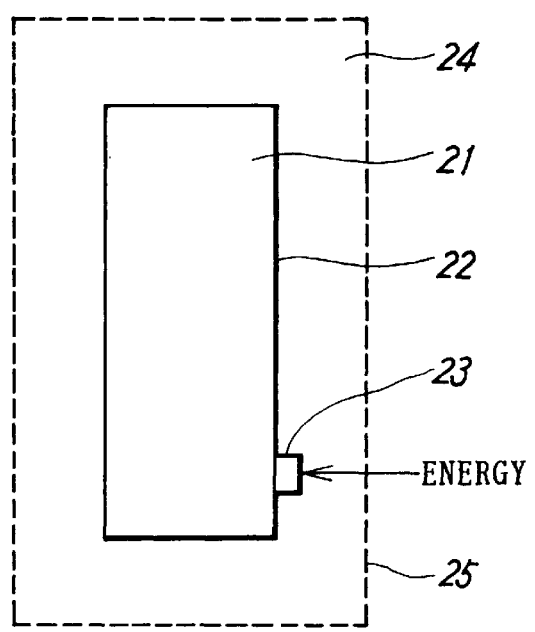
FIG. 10 illustrates the structure of a conventional heat-storage type heater or a conventional storage type heating-device.

FIGS. 8 and 9 are a cross-sectional view and a plan view of a floor heating system using the heat-storage type heater of the first embodiment, respectively. In these figures, the heat-storing material 1 capable of being supercooled is filled into the small containers 2 elongated in the horizontal direction, similarly to the first embodiment. A part of the containers 2 contact the pipe 3a for a low temperature fluid, which constitutes the means 3 for releasing the supercooled state. The small containers 2 filled with the heat-storing material 1 are disposed in parallel on the thermal insulating member 13 mounted on a base board 12. A heating pipe 14 is disposed thereon. A thermal conductive material 16 such as mortar, wood, or the like is arranged on the upper side of the containers 2 and between the portions of the heating pipe 14. A floor board 17 is laid on floor joists 18 disposed on the base board and on the above-described thermal conductive material 16. The floor board corresponds to the thermal radiation surface in the first embodiment.

According to the floor heating system, the same advantages as described in the first embodiment and so forth can be attained. This floor heating system contains the heat-storage type heater of the first embodiment, and may employ the heat-storage type heaters of the second to fifth embodiments. The heat-storage type heater of the present invention can be applied in various uses effectively utilizing heat-storage as stoves, hot water supply systems, and so forth, in addition to floor heating systems.

The above-described heat-storage type heater of the present invention uses the heat-storing material which is capable of being supercooled and is filled into a plurality of small containers together with a phase-segregation preventive agent. Thus, the segregation and efflorescence can be prevented for a long time, and the degree of supercooling can be maintained on a high level. Accordingly, the heat emission to be applied every an even number of times in the case in which the heat emission cycle is repeated a plurality of times can be realized by using a small amount of energy to induce the crystallization of the heat-storing material, even if there is no heat which is externally supplied by using the heat exchanger. As the means for releasing the supercooled state to induce the crystallization, heat exchangers, thermoelectric elements, vibrators, electrodes, or the like can be selected.

The means for releasing the supercooled state can be used more effectively by using the small containers filled with the heat-storing material each of which has an elongated shape.

Moreover, the time at which the heat-storing material is crystallized can be optionally set by adjusting the thermal properties and mass of the heat-storing material, heating temperature, the characteristics of the thermal insulating material covering the heat-storage type heater. That is, the crystallization can be induced, and the device can be prevented from becoming complicated, not by using the means for releasing the supercooled state.

Moreover, floor heating systems having a high heat utilization efficiency can be provided by using the heat-storage type heater of the present invention.

What is claimed is:

1. A heat storage heater comprising means for supplying heat to a heat-storing material capable of being supercooled, the heat-storing material being filled into a plurality of small containers, means for releasing the supercooled state of the heat storing material which is disposed so as to be in contact with a part of each small container through which the supercooled state is released, and a thermal radiation surface.

2. A heat storage heater according to claim 1, wherein the means for releasing the supercooled state comprises a heat exchanger which is disposed so as to be in contact with the containers for the heat-storing material, and circulates a fluid.

3. A heat-storage heater according to claim 1, wherein the means for releasing the supercooled state comprises a thermoelectric element disposed so as to be in contact with the containers for the heat-storing material.

4. A heat-storage heater according to claim 1, wherein the means for releasing the supercooled state comprises a vibrator disposed so as to be in contact with the containers for the heat-storing material.

5. A heat-storage heater according to claim 1, wherein the means for releasing the supercooled state comprises electrodes disposed so as to be in contact with the containers for the heat-storing material.

6. A heat-storage heater, comprising means for supplying heat to a heat-storing material capable of being supercooled, the heat-storing material, together with a phase-segregation prevention agent, being filled into a plurality of small containers, and a thermal radiation surface, wherein the heat-storing material capable of being supercooled spontaneously starts to be solidified at a predetermined temperature in the supercooled state thereof.

7. A heat-storage heater, comprising means for supplying heat to a heat-storing material capable of being supercooled, the heat-storing material, together with a phase-segregation prevention agent, being filled into a plurality of small containers, means for releasing the supercooled state of the heat-storing material which is disposed so as to be in contact with a part of each small container through which the supercooled state is released, and a thermal radiation surface.

8. A heat-storage heater according to claim 7, wherein the small containers have a shape elongated in the horizontal direction.

9. A heat-storage heater according to any one of claims 1–5, 6 and 7, wherein the means for supplying heat to the heat-storing material comprises a heat exchanger which circulates a fluid therein.

10. A heat-storage heater according to any one of claims 1–5, 6 and 7, wherein the means for supplying heat to the heat-storing material comprises an electric heater.

11. A heat-storage heater according to any one of claims 1–5, 6 and 7, wherein the heater is covered with a thermal insulating material except for the thermal radiation surface.

12. A heat-storage heater according to any one of claims 1–5, 6 and 7, further comprising means for causing forced convection of a fluid on the thermal radiation surface so that the thermal radiation is accelerated.

13. A heat-storage heater according to any one of claims 1–5, 6 and 7, wherein the heat-storage heater is formed as a floor heating unit.

14. A heat-storage heater according to any one of claims 1 to 5 and 7, wherein the small containers have a shape elongated in the horizontal direction, the means for releasing the supercooled stated is in contact with a part of an end of the lengthwise direction of each small container.

* * * * *